United States Patent
Amon et al.

(10) Patent No.: US 6,194,060 B1
(45) Date of Patent: *Feb. 27, 2001

(54) OPAQUE POLYMERIC FILMS AND PROCESSES FOR MAKING THE SAME

(75) Inventors: Moris Amon, Pittsford; Michael L. Kerr, Phelps, both of NY (US)

(73) Assignee: Mobil Oil Corporation, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/252,449

(22) Filed: Feb. 18, 1999

(51) Int. Cl.$^7$ .............................. B29C 67/20; B32B 3/26
(52) U.S. Cl. ................... 428/315.9; 264/46.1; 264/46.3; 428/318.6; 428/318.8; 428/319.9; 428/910
(58) Field of Search ..................... 428/315.9, 318.6, 428/318.8, 319.9, 910; 264/46.1, 46.3

(56) References Cited

U.S. PATENT DOCUMENTS

| 4,632,869 | 12/1986 | Park et al. | 428/315.5 |
|---|---|---|---|
| 4,652,489 | 3/1987 | Crass et al. | 428/337 |
| 4,758,462 | 7/1988 | Park et al. | 428/213 |
| 5,231,126 | * 7/1993 | Shi et al. | 524/296 |
| 5,709,937 | * 1/1998 | Adams et al. | 428/332 |

* cited by examiner

Primary Examiner—Blaine Copenheaver
(74) Attorney, Agent, or Firm—Dennis P. Santini; T. Dean Simmons

(57) ABSTRACT

An opaque, oriented polymeric film structure comprises: (a) a core layer containing a thermoplastic polymeric matrix material which has a first surface and a second surface, the core layer having a plurality of voids, substantially all or all of the voids being free from a void-initiating particle and at least some of the voids being interconnected with an adjacent void in the polymeric matrix material, the number of voids not containing a void-initiating particle being sufficient to impart a significant degree of opacity to the film structure; and (b) at least one outer or skin layer containing a thermoplastic polymeric material and an effective amount of a nucleating agent to suppress cavitation in said at least one outer or skin layer. The film structure has a smooth surface and can be tailored to provide a controlled permeability, and is particularly suitable for food packaging.

12 Claims, 2 Drawing Sheets

A = A-side surface
B = Core
C = C-side skin

A = A-side surface
B = Core
C = C-side skin

A = A-side surface
B = Core
C = C-side skin

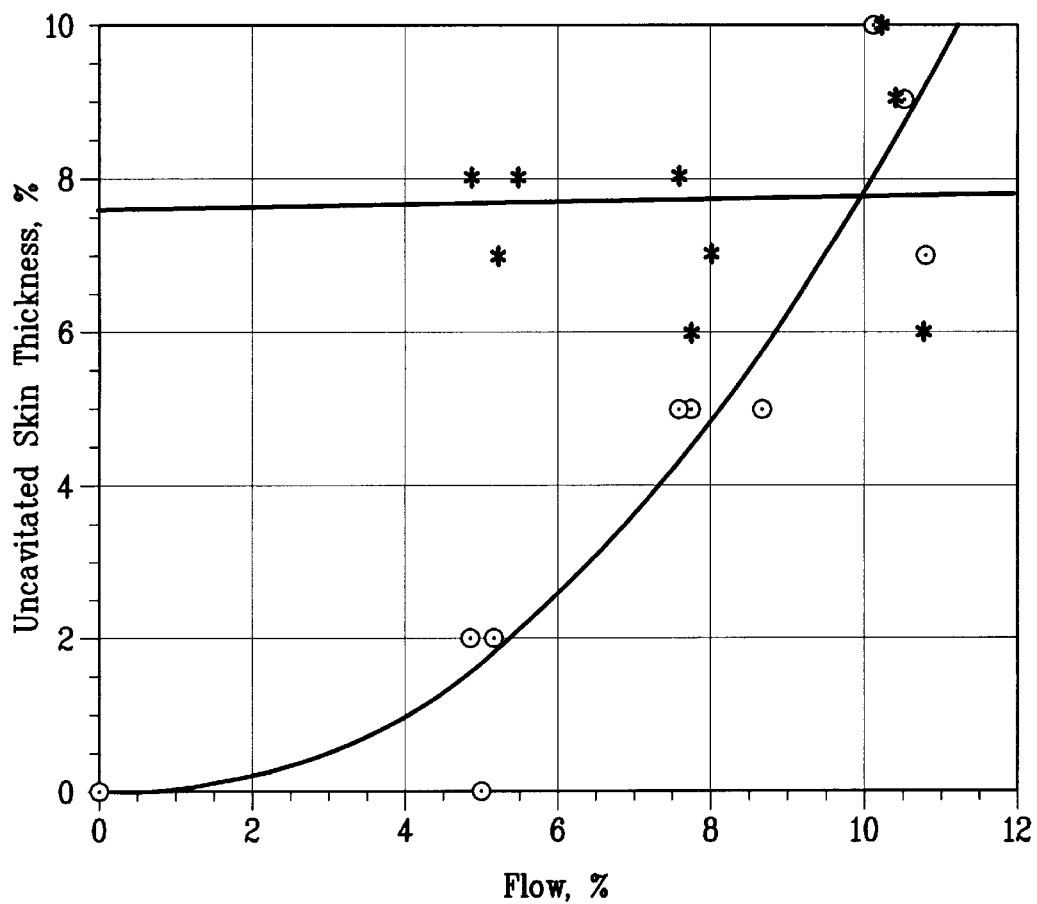

OPAQUE POLYMERIC FILMS AND PROCESSES FOR MAKING THE SAME

FIELD OF THE INVENTION

The present invention relates to opaque, oriented polymeric films and to processes for making such films. More particularly, the invention relates to opaque, oriented polymeric films comprising a cavitated or voided core layer and at least one smooth outer or skin layer, and to processes for making the same.

BACKGROUND OF THE INVENTION

In the packaging of certain types of foodstuff products, such as snack foods, it is common practice to use a polymeric packaging film. A highly desirable property for such packaging films is opacity which protects the packaged foodstuff product from deterioration caused by exposure to light. In particular, it has been found that certain wavelengths of light up to about 450 nm cause increased spoilage in the packaged products. Even when a degree of opacity is present in the film, spoilage may occur if the film allows passage of some light. Thus, highly opaque films are desirable for these purposes.

Typically, such opaque polymeric packaging films are multi-layer films comprising an opaque, thermoplastic polymeric core layer having one or more skin layers thereon. The skin layers contribute various desirable characteristics to the packaging film, such as heat sealability, improved appearance, enhanced machine handling capabilities, and the like.

One type of such multi-layer opaque packaging film is disclosed in U.S. Pat. No. 4,632,869 to Park et al. This patent discloses an opaque, biaxially oriented film structure having a polymer matrix with strata of cavitated voids, in which the voids contain spherical void-initiating particles of polybutylene terephthalate (PBT). The structure may also include thermoplastic skin layers, and the film can also include from about 1 to 3% by weight of a pigment such as $TiO_2$ or colored oxides.

U.S. Pat. No. 4,758,462 to Park et al. discloses an opaque, biaxially oriented film with a cavitated core layer and transparent skin layers. Colored light absorbing pigments such as carbon black or iron oxide are added to the core and/or the skins in an amount of 2 to 12 wt % to decrease light transmission through the film.

In addition, U.S. Pat. No. 4,652,489 to Crass et al. discloses an oriented, sealable, opaque polyolefin multi-layer film with a core layer containing vacuoles or voids, a sealable surface layer, and a non-sealable surface layer which incorporates a slip agent such as a polydiorganosiloxane.

Copending U.S. patent application Ser. No. 08/686,287, filed Jul. 25, 1996, now allowed, which is incorporated herein by reference in its entirety, discloses opaque, oriented polymeric films having void structures which do not require the use of immiscible and incompatible void-initiating particles for void formation and to processes for preparing such films. The process for preparing such films is essentially one in which the polymer (e.g., propylene homopolymer) is stretched rapidly at the start of and simultaneously with crystallization. In one aspect, the process described in the copending application comprises preparing a melt containing a crystallizable polymeric matrix material at a temperature of at least about the melting point of the polymeric matrix material, forming the melt into a sheet containing molten polymeric matrix material, cooling the sheet containing molten material to form a sheet containing amorphous polymeric matrix material and crystallites of the polymeric matrix material, and forming the sheet while containing the amorphous polymeric matrix material into a film by stretching the sheet in at least one direction so as to form voids adjacent to at least some of the crystallites and thereby impart opacity to the film. It is believed that microscopic tears are initiated at the crystalline-amorphous phase interfaces under the applied tensile stress during film production. These tears are enlarged into cavities as the stretching proceeds.

While the above processes for producing opaque polymeric films are generally satisfactory and more than acceptable films can be produced therefrom, there may be several disadvantages or problems associated with the processes. For one, in cases where a void-initiating particle is used to provide opacity, the raw material costs of the void-initiating filler particles are often quite high relative to the raw material costs of the thermoplastic polymeric matrix material. For example, filler particles of PBT, a material which has found commercial acceptance as a void-initiating particle in matrix materials of polyolefins such as polypropylene, are quite expensive on a weight basis as compared to the matrix material, oftentimes up to three times more costly. Further, since the filler particles of materials such as PBT have a density which is greater than that of the matrix material such as polypropylene, the cost penalty per unit volume or area of the resultant film is even greater. For particles of materials other than PBT, the cost differences may be greater or less depending upon the particular material selected.

Additionally, some materials such as PBT, when used as the filler particles, may tend to decompose during extrusion of the film, thereby leaving an objectionable scale or deposit on the surfaces of processing equipment. In the case where PBT decomposes, the deposit may be in the form of an eggshell-like scale on the processing equipment. This scale occasionally breaks up, causing visual defects or breaks in the film in downstream processing. For example, it has been found that a typical line for forming white opaque film using PBT as the void-initiating particles can suffer ten or more hours of downtime per month as a result of these scale formation problems and subsequently necessary die cleanups and the like.

Regardless of the method of cavitation employed, if the film consists of a single cavitated layer or if the cavitated layer(s) is/are external, then the cavities or voids may be close to the surface of the film and even break through the surface. Such a film may have a rough surface, which may be aesthetically objectionable in certain applications. When void-initiating particles are the means of cavitation, it is typical to solve this problem by a film structure comprising at least three layers, where the outermost two layers contain no void-initiating particles and are therefore free of voids. When the method of the above-mentioned copending application Ser. No. 08/686,287, now allowed, is employed to obtain cavitation, a different approach is possible and is the subject of the present invention.

SUMMARY OF THE INVENTION

Accordingly, an object of the present invention is to provide thermoplastic film structures having high opacity and good surface characteristics, which are useful for a variety of applications, including use as packaging films, and processes for making such film structures.

It is another object of the present invention to provide opaque film structures which are free from, or substantially free from, void-initiating particles and yet which possess good surface characteristics, and processes for making such film structures.

It is a further object of the present invention to provide opaque film structures having good surface characteristics, which do not contain, or contain only low amounts of, void-initiating particles or other relatively expensive components so as to reduce the material costs in fabricating such films.

It is yet another object of the present invention to provide opaque film structures having improved processability and good surface characteristics, wherein scale formation in processing equipment is reduced or even eliminated.

It is another object of the present invention to provide porous thermoplastic film structures in which the high gas permeability of the film can be controlled and tailored, if desired.

These and other objects of the present invention may be achieved by providing an opaque, oriented polymeric film structure comprising:

(a) a core layer containing a thermoplastic polymeric matrix material which has a first surface and a second surface, the core layer having a plurality of voids, substantially all or all of the voids being free from a void-initiating particle and at least some of the voids being interconnected with an adjacent void in the polymeric matrix material, the number of voids not containing a void-initiating particle being sufficient to impart a significant degree of opacity to the film structure; and (b) at least one outer or skin layer containing a thermoplastic polymeric material and an effective amount of a nucleating agent to suppress cavitation in said at least one outer or skin layer.

Other embodiments, objects, and advantages of the present invention will be apparent to those skilled in the art upon consideration of the entire present specification, the claims appended hereto, and the accompanying drawings.

BRIEF DESCRIPTION OF THE DRAWINGS

FIG. 3 represents the average thickness of the uncavitated outer skin layer as a fraction of the total film thickness versus the flow rate out of each co-extruder as a fraction of the total flow rate according to Example 3.

DETAILED DESCRIPTION OF THE PREFERRED EMBODIMENTS

Figure 1:
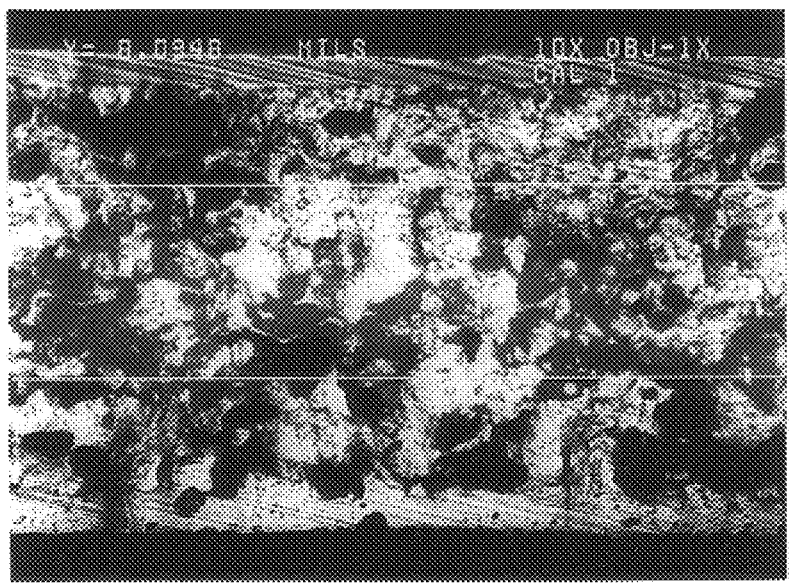
FIG. 1 is a cross-section of a polymeric, uniaxially stretched film structure according to Example 1 (Comparative).

The outer or skin layer which provides an opaque, oriented polymeric film structure having a smooth surface in this invention comprises a thermoplastic polymeric material and an effective amount of a nucleating agent to prevent cavitation therein.

The inclusion of a nucleating agent in the film (e.g., an outer or skin layer) can effectively prevent cavitation even under conditions where cavitation easily occurs in the absence of a nucleating agent. While not wishing to be bound by theory, it is believed that crystallization starts prematurely at higher temperatures (e.g., above 120° C.) due to the nucleating agent and is too far advanced to initiate microscopic tears when a stretch force is applied to the film. Instead, when a nucleating agent is used, crystallite orientation occurs. As a result, a clear film layer can be formed.

The effect of the nucleating agent, as described above, provides an opaque, oriented polymeric film structure having many advantages. In particular, while the film production processes of copending U.S. patent application Ser. No. 08/686,287 (now allowed) solve many problems of the prior art, some of the cavities in the film structure described in the above-noted copending application may be very close to the surface of the film structure, and in some cases, the cavities may break through the surface. Thus, the film structure described in the copending application, in practice, may have a rough surface, which may be aesthetically objectionable in some applications.

As described above, the use of a nucleating agent enables the production of a clear film layer which, when coextruded with a cavitated film layer, provides a film structure having a smooth surface. In addition, the use of a nucleating agent enables the high gas permeability of the film structure to be controlled according to the needs of the particular application.

In a preferred embodiment, a nucleating agent is included in at least one layer of the film structure described in copending U.S. patent application Ser. No. 08/686,287, now allowed, to provide an opaque, oriented polymeric film structure which is relatively low in cost, exhibits improved processability (e.g., no detrimental scale formation), and possesses a smooth surface.

The core layer contains a plurality of voids, wherein substantially all of the voids are free from void-initiating particles and at least some of the voids are interconnected with an adjacent void in the polymeric matrix material, and wherein the number of voids not containing a void-initiating particle is sufficient to impart a significant degree of opacity to the film structure. Preferably, none of the voids contain any void-initiating particle. The phrase "significant degree of opacity" means a visible light transmission of less than about 60%.

Once the appropriate mixture for the core layer material is formulated, the mixture is melted and then extruded into a film sheet. Thereafter, the molten extruded film sheet is suitably cooled into an amorphous state. Of particular significance is that this cooling step is controlled such that the extruded sheet does not completely crystallize at this stage of the process, but crystallization of the polymeric matrix material is initiated. The sheet is promptly stretched while it is in this sub-cooled amorphous state. Under these controlled thermal conditions, microscopic tears are initiated at the crystalline-amorphous phase interfaces with applied tensile stress, and cavitation or void formation occurs spontaneously within the film sheet during the stretching procedure. After stretching, the resultant film is quenched so as to crystallize the polymeric film matrix as completely as possible. The processes for forming the core layer, as well as the mechanism behind the formation of the voids in the absence, or substantial absence, of void-initiating particles, are described in further detail in copending U.S. patent application Ser. No. 08/686,287, filed Jul. 25, 1996, now allowed, which is incorporated herein by reference.

Thus, the film production process of the present invention preferably comprises: (a) preparing a melt containing a crystallizable polymeric matrix material at a temperature at least above the melting point of the polymeric matrix material; (b) preparing a melt containing a thermoplastic polymeric material and a nucleating agent; (c) coextruding the melts of steps (a) and (b) into an intermediate film structure comprising a first or core layer and an outer or skin layer; (d) cooling the coextruded film structure to form a structure comprising a core layer containing amorphous polymeric matrix material and crystallites of the polymeric matrix material and an outer or skin layer; and (e) forming the film structure while the core layer contains amorphous polymeric matrix material by stretching the second intermediate film structure in at least one direction so as to form voids adjacent to at least some of the crystallites in the core layer and thereby impart opacity to the film structure.

In the present invention, a nucleating agent is usually incorporated in a thermoplastic polymeric film layer other than the core layer. Specifically, the nucleating agent may be incorporated in an outer or skin layer of the film structure. By adding the nucleating agent to such an outer or skin layer, crystallization starts prematurely and is too far advanced to initiate microscopic tears during stretching as in the core layer. Hence, this process enables the prevention of a rough film structure surface, which can be formed by undesirable cavitation very close to the film structure surface.

The polymeric matrix material of the opaque films of the present invention may be primarily composed of a wide variety of polymeric materials which crystallize, preferably as long as such materials meet certain criteria. In particular, suitable polymeric materials have a crystallization rate such that the material may be cooled to an amorphous state without significant crystallization in an industrial operation, but can thereafter be crystallized from the amorphous state upon stretching. In other words, the crystallization rate is neither too fast nor too slow such that the subject processes can be practiced on an industrial scale by providing sufficient time to stretch the material after crystallization is initiated, but while the majority of the polymeric material remains in the amorphous state. Polymeric materials having a crystallization rate approximating that of polypropylene are particularly suitable. Also, the polymeric matrix material, after being subjected to the processes of the present invention, preferably results in an opaque film which exhibits a significant degree of crystallinity such as, for example, at least about 30%, preferably at least about 50%.

Specifically, the polymer matrix material of the first or core layer may include one or more polyolefins alone or in conjunction with other polymeric materials which satisfy the above condition. Exemplary polyolefins include polypropylene, polyethylene, polybutene, olefin copolymers, and blends thereof. Species of these polyolefins such as high density polyethylene, linear low density polyethylene, ultra low density polyethylene, and linear low density ethylene copolymerized with less than about 10% by weight of another alpha-olefin such as propylene and butene may be used. Also contemplated are copolymers of polyolefins including block copolymers of ethylene and propylene, other ethylene homopolymers, copolymers and terpolymers, or blends thereof. Other suitable polymers include, but are not limited to, halogenated polyolefins, polyesters such as polyalkylene terephthalates including polybutylene terephthalate, polyethers, and polyamides such as nylon. An isotactic polypropylene having an isotacticity index of at least about 80% by weight, preferably about 95 to 100%, as measured by determining the amount of insolubles in xylene.

It is further contemplated that one or more additives such as pigments, fillers, antioxidants, antistatic agents, slip agents, anti-tack agents, absorbents, and the like can be optionally included in optimum amounts in the core layer of the film structure.

With respect to the outer or skin layer, which may be formed on one or more surfaces of the core layer by coextrusion or the like, the thermoplastic polymer material contained therein may be, but not limited to, polymers such as one or more of polyolefins, including polyethylene (e.g., high density polyethylene, linear low density polyethylene, ultra low density polyethylene, and linear low density ethylene copolymerized with less than about 10% by weight of another alpha-olefin such as propylene or butene), polypropylene, polybutylene, and the like. Also contemplated are block copolymers of ethylene and propylene, random copolymers of ethylene and propylene, other ethylene homo-, co- or terpolymers, or blends thereof. The homopolymer may be formed by polymerizing the respective monomer using known techniques such as bulk or solution polymerization.

The outer or skin layer may be an encapsulating layer, a heat sealable layer, or the like. The thickness of the outer or skin layer may be varied according to the desired end use, appearance, properties (e.g., gas barrier properties), and the like. Preferably, the combined thickness of the outer or skin layers is about 5 to 70% of the overall thickness of the film structure, which has a preferred thickness of about 0.5 mil to 30 mils. Further, at least one other outer or skin layer, or some other coating or layer, may be formed on the surface of the outer or skin layer. It should be noted that the outer or skin layer can be transparent or pigmented, and can be of the same or different material as the polymeric matrix material of the core layer.

To enhance the opacity, whiteness, and low light transmission of the film structure, a pigment such as titanium dioxide may be added in a preferred amount of about 1 to about 12% by weight to the melt mixture forming the core or outer skin layer(s) prior to extrusion. The whiteness allows printing without the use of white ink.

The processability and machinability of the film structure may be enhanced by the addition of a small amount of a finely divided inorganic material in the polymeric material of the outer or skin layer. Such inorganic materials can not only impart anti-block properties to the film structure, but can also reduce the coefficient of friction of the resulting film structure. Suitable finely divided inorganic materials include syloid, a synthetic amorphous silica gel containing primarily silica, diatomaceous earth having particles which are porous and irregularly shaped, dehydrated kaolinite which particles are thin, flat platelets, and synthetic precipitated silicates in which the particles are porous and irregularly shaped. Such particles generally have a particle size of about 1 to 10 microns.

As in the case of the polymeric matrix material of the first or core layer, other additives such as fillers, antioxidants, antistatic agents, slip agents, anti-tack agents, absorbents, and the like can be included in the outer or skin layer(s) in optimum amounts.

Any nucleating agent may be used to make the outer or skin layer(s) as long as the effects of the present invention are achieved. Suitable nucleating agents include, but are not limited to, sodium benzoate, calcium stearate, aluminum dibenzoate, aluminum adipate, sodium succinate, sodium glutarate, and sorbitol derivatives such as 3,4-dimethylbenzylidene sorbitol. Although the range of amounts of the nucleating agent may vary depending on the types of thermoplastic polymer material and nucleating agent selected, a particularly preferred range of amounts for the nucleating agent is from about 0.01 to about 0.5 wt %, based on the total weight of the outer or skin layer (i.e., the total weight of the material introduced into each of the co-extruders forming the outer or skin layer(s)). Where the nucleating agent is a sorbitol derivative, the preferred amounts are usually about 0.05 to about 0.2 wt %.

In general, stretching of the films is not particularly limited, and may comprise uniaxial or biaxial stretching. If biaxial stretching is performed, it is preferably conducted sequentially, although simultaneous stretching in both the machine and transverse directions is also contemplated. As the particular materials used in forming the films may vary, the conditions and degree of orientation or stretching may be altered accordingly to achieve the desired results. Generally, a machine direction orientation of about 4 to about 8 times and a transverse direction orientation of from about 4 to about 10 times yield polyolefin film structures having satisfactory characteristics including opacity.

Certain components of conventional equipment typically used for orienting polymeric films may be utilized in the processes of the present invention. For example, longitudinal or machine direction stretching may be advantageously conducted using two rolls running at different speeds according to the desired stretching ratio, and transverse stretching may be conducted using an appropriate tenter frame. It should be recognized that even uniaxial stretching such as created by drawing rolls results in biaxial stress since contraction of the sheet in the transverse direction which would normally occur is prevented by adhesion between the roll and the sheet.

After stretching and consequent formation of voids within the core layer, the film structure may be subjected to a heat treatment for annealing for a short period up to about 10 seconds or more. Additionally, one or more of the outer surfaces of the film structure of the present invention may be treated to improve their surface energy such as by, for example, chlorination, oxidation, plasma, flame or corona discharge treatments. Such surface treatments can improve the adhesion of the film structure to metal layers, inks and/or other coating or laminating materials. Thereafter, the film structure may be wound up in a conventional manner using a wind-up device.

The opaque thermoplastic polymeric film structures of the present invention may be used for a variety of purposes, either alone or in conjunction with other structures such as coatings, coextruded film layers of the same or different composition, adhered film layers of the same or different composition, and the like. In particular, the opaque film structures of the present invention may be tailored to have substantial gas permeation rates such that the films can be considered to be essentially porous. Thus, the opaque film structures of the present invention are suitable as "breathable" films for certain packaging and medical applications where gas transmission is desirable. The film structures of the present invention may be used as permeation control devices.

The porous nature of the film core according to an aspect of the present invention is in distinct contrast to the opaque films of the previously-mentioned Ashcraft et al. patent using immiscible void-initiating particles as evidenced by the latter films' relatively low oxygen transmission rate characteristics. The films of the Ashcraft patent are described as containing voids which are closed cells such that there are virtually no paths open from one side of the film to the other through which gas or liquid can traverse. In the usual embodiment of the present invention, many of the voids in the core layer have openings extending between adjacent voids such that paths permitting gases or liquids to traverse from one side of the film to the other exist. In addition, portions of the walls between adjacent voids may be extremely thin, and thus, there is diffusion of gases from one void to another, further contributing to the high gas transmission rate characteristics. However, the nucleated skin layer(s) is (are) largely non-porous, and by adjusting its (their) thickness, one may achieve a degree of control on overall film permeability The following examples illustrate the present invention:

EXAMPLE 1 (COMPARATIVE)

Homo-polypropylene (PP) resin, having a melting point of about 320° F., a crystallinity of about 60% (by differential scanning calorimetry), and a melt flow rate of about 3.5 (per ASTM method D1238, at 230° C. and 2,160 g load), and sold by Fina under the trade name Fina 3371 was extruded through a laboratory film extrusion system. There was no additive in the resin other than a minimal amount of antioxidant added by the supplier.

One main extruder, with a screw diameter D of 1.25" and a length/diameter ratio L/D of 24, and two coextruders, each with a D of 1.0" and a L/D of 24, were used concurrently to melt and pump the same resin. The die was fed by an adapter and manifold block combining the outputs of the extruders into an A/B/C layer structure, where B refers to the layer from the main extruder and A and C to the layers from the co-extruders. The die had a single coat-hanger type cavity, and exit gap and width of 0.060 and 6 in, respectively. The molten sheet temperature was 400–405° F. at the die lip, as measured by an infrared (IR) pyrometer. The total output rate was estimated at 126 g/min (based on previous screw speed-output calibrations of the extruders.)

The extruded sheet was contacted on alternating sides by a series of five 6.0" diameter rolls with centers arranged on a horizontal straight line at 6.75" spacing, except for the third-fourth roll center spacing, which was adjustably set to 6.14 in. The top of the first roll was approximately 0.5" above the die lip. Roll heat transfer fluid temperatures were controlled at 200, 240, 240, 250, and 250° F., successively. The first three rolls turned at a surface speed of 2.2 ft/min, and the last two at 10.1 ft/min, thus providing a machine direction (MD) stretch ratio of 4.6. The first two rolls had chromed steel shells whereas the last three were rubber clad to prevent slippage during MD stretching.

The MD-stretched sheet was taken into a tenter oven at 10 ft/min. The oven was heated by planar IR radiant heaters placed above and parallel to the film plane. The tenter had a parallel-rail preheat zone 11" long, followed by a diverging-rail transverse direction (TD) stretch zone 56" long, and finally a parallel-rail annealing zone 50" long. The mechanical TD stretch ratio was 5, but true local TD stretch ratio at the web center was determined as 7.9 (by making pen marks TD-spaced 1.0" on the sheet at the tenter entrance and measuring the TD spacing of these marks at the tenter exit.) Plastic temperature reached an estimated maximum of 240° F. in the stretch zone (based on a separate set of IR pyrometer measurements.) After the tenter, the thick edge tapes were slit off, and the finished film was wound on a pneumatic winder.

The PP sheet could be seen to turn from transparent to white-opaque over a well-defined and narrow region between the third (slow) and fourth (fast) roll. Microscopic examination of the MD-stretched sheet showed a relatively coarse porous structure, as shown in FIG. 1. On the A side of the sheet, the cavities broke through the surface in many places. The C side exhibited a fairly continuous skin, with only a few small voids.

The C side exhibited a fairly continuous skin, with only a few small voids, because the extruded sheet contacted the first roll on the C side. The skin was formed by freezing and early crystallization of the molten PP on the 200° F. first roll. This prevented cavitation upon MD stretching. The bulk of the PP was maintained at higher temperatures and had some but no more than 10% crystallinity when it arrived to the MD stretch gap between the third and fourth rolls (as determined by mathematical modeling of the process.) These were the right conditions for cavitation to occur in the bulk of the PP upon MD stretching.

The surface of the final film produced had a rough feel and appearance on the A side but was smoother on the C side.

EXAMPLE 2

A sorbitol-based nucleating agent, sold by Milliken & Co. under the trade name Millad 3988, was added, in the form of a 10% masterbatch, at a final concentration of 0.15% by weight to the PP resin in the main (B) extruder. This extruder produced the core or B layer, which amounted to 90% of the total film mass. The equipment and process conditions were the same as in Example 1.

The voids in the MD-stretched sheet practically disappeared as soon as this change of material became effective. It was noticed that the sheet became cloudy or translucent on the first roll, whereas in Example 1, it had been transparent there. On the other hand, no appreciable whitening occurred upon MD elongation between the third and fourth rolls. When the thin outer A and C layers, which contained no nucleating agent, were eliminated by stopping the corresponding extruders, a perfectly clear and transparent MD-oriented sheet was obtained.

These observations were interpreted as follows: There was premature (in terms of cavitation) crystallization on the first roll, due to the effect of the nucleating agent. This made the sheet less transparent. By the time the sheet reached the MD stretch region, its crystallization had proceeded too far for successful void formation.

Process conditions were altered to find if a regime capable of producing voids in the presence of nucleating agent could be found: Nucleating agent concentration was lowered to 0.05 wt %; die exit melt temperature was raised from 400 to 430° F.; line speed was almost tripled to reduce the residence time on the first three rolls. The MD-stretched sheet remained free of voids in all instances.

EXAMPLE 3

0.15% Millad 3988 was added to each of the A and C outer layers of the film, while the B layer consisted of neat Fina 3371 polypropylene. The thickness of each of the A and C layers were varied systematically by changing the A and C extruder screw speeds. Optical cross-sectional micrographs of the resulting MD-stretched sheets were scaled to determine the thickness of each of the two skin layers on the A and C sides of the film, as well as the total thickness. The skin layers were defined by the absence or scarcity of voids in them. The A and C side skins, however, could not be identified a priori with the actual A and C layers, whose material came entirely and exclusively from extruders A and C, by definition. The skins owe their existence to early crystallization of PP due to heat removal from the sheet by rolls or ambient air, accelerated by nucleating agent, where available.

Figure 2:
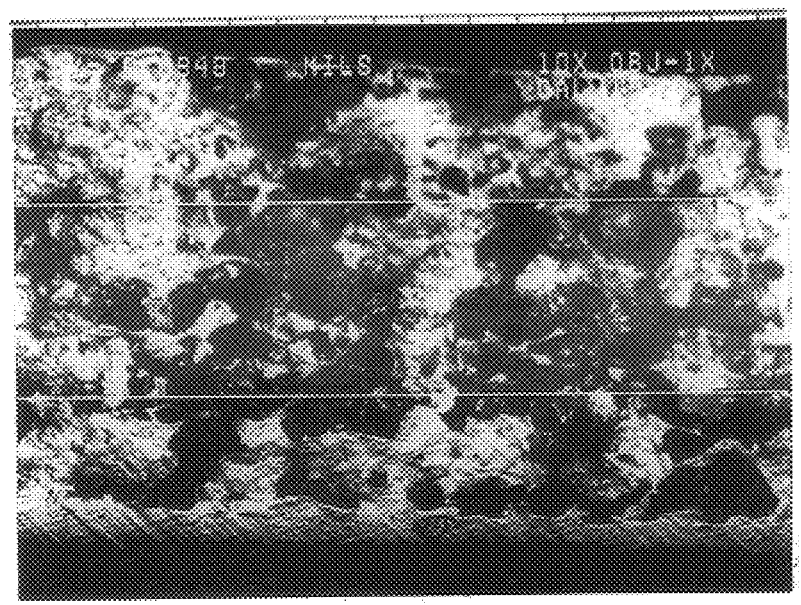
FIG. 2 is a cross-section of a polymeric, uniaxially stretched film structure according to Example 3.

FIG. 2 shows a typical MD-stretched sheet cross-section for a case where a frozen skin is clearly visible on both sides. This is to be contrasted with FIG. 1, corresponding to Example 1 (Comparative), where a skin was visible on the C side only. Film samples obtained from MD-oriented sheet similar to that represented in FIG. 2 were tangibly smoother on both sides than either side of the sample of Example 1.

The quantitative data are shown in FIG. 3. The vertical axis represents the average thickness of the frozen, nearly void-free (uncavitated) skins as a fraction of the total sheet thickness. The horizontal axis represents the flow rate out of each co-extruder as a fraction of the total flow rate (based on previous screw speed-output calibrations.) On the C side, the skin thickness is constant at 8% of the total, even when extruder C is stopped and there is no nucleating agent on this side. The reason is that heat removal on the C side, which touches the relatively cold (200° F.) first roll, is so effective that even in the absence of nucleating agent, a skin crystallizes past the upper limit permissible for cavitation. It is surmised that if the C flow fraction were increased beyond the range of FIG. 3, the C side skin thickness would eventually rise above 8%.

In contrast, on the A side, in the absence of nucleating agent, heat removal by the ambient air and by the relatively hot (250° F.) second and third rolls is so slow that crystallinity is within the required range for cavitation at the time of MD stretching. When nucleating agent is added, the crystallization temperature is raised and a skin forms. The thickness of this skin approximately corresponds to the thickness of the nucleated C layer, which naturally increases with increasing relative C flow.

EXAMPLE 4

MD and TD oriented film was made by the process of Example 1 (Comparative). However, this time the film structure was B/D/C, where layer B still came from the main extruder and C and D from the co-extruders of the same designations. The C side still contacted the first roll. Co-extruder D was identical to A and C in terms of screw design. Three variables were produced: (1) neat PP in all layers; (2) Millad 3988 nucleating agent in C; and (3) Millad 3988 nucleating agent in C and D. The oxygen and water permeabilities were measured according to ASTM test methods D3985 and E96, respectively. The conditions for water vapor permeability testing were 100° F. and 90% relative humidity (r.h.) The conditions for oxygen permeability testing were 73° F. and 0 r.h. The data are tabulated in Table 1.

TABLE 1

| | Oxygen permeability scc · mil / atm · day · 100 in$^2$ | Water vapor permeability g · mil / day · 100 in$^2$ |
|---|---|---|
| 1) No nucleating agent | $(2.8 \pm 2) \times 10^4$ | $12 \pm 7$ |
| 2) Nucleating agent in C layer only | $(4.0 \pm 2) \times 10^3$ | $5.6 \pm 0.9$ |
| 3) Nucleating agent in both C and D layers | $1310 \pm 20$ | $3.4 \pm 0.5$ |

The first value listed in each cell of Table 1 is an average, with the ± deviation indicating the range. The original raw data were analyzed by standard statistical methods, including the steps of: (1) data transformation for variance stabilization; (2) analysis of variance; and (3) verification of underlying assumptions. In summary, it was determined that all of the relevant differences in Table 1 are statistically significant, and cannot be attributed to chance, even though the random variance is quite large in places.

For reference, typical oxygen and water vapor permeabilities of clear uncavitated biaxially oriented PP are 150 scc·mil/atm·day·100 in$^2$ and 0.4 g·mil/day·100 in$^2$, respectively. It is seen that much greater permeabilities are obtained in all cases. This is due to the porous nature of the film and to fissures in the skin layers. Going from a purely thermally induced frozen skin (Case 1) to a nucleated one (Case 2), a roughly 5-fold decrease in permeability occurs. Since FIG. 3, curve C, applies to case 2, this must be due to a reduction in the number or size of fissures rather than thickening of the skin. Going from a situation where nucleated material makes up 6% of the total flow (Case 2) to one where it makes up 18% (Case 3) thickened the frozen layer as well. It is noteworthy that when nucleating agent was used, the random variance dropped dramatically, both in absolute terms and in relation to the mean.

These data show that a nucleating agent can be used to control the permeability of porous films at desired high levels by the agency of a relatively void-free skin layer.

What is claimed is:

1. An opaque, oriented polymeric film structure comprising:
    (a) a core layer consisting essentially of a thermoplastic polymeric matrix material which has a first surface and a second surface, the core layer having a plurality of voids, substantially all or all of the voids being free from a void-initiating particle and at least some of the voids being interconnected with an adjacent void in the polymeric matrix material, the number of voids not containing a void-initiating particle being sufficient to impart a significant degree of opacity to the film structure; and
    (b) at least one outer or skin layer containing a thermoplastic polymeric material and an effective amount of a nucleating agent to suppress cavitation in said at least one outer or skin layer,
wherein said film structure is made by a process comprising melting and extruding said thermoplastic polymeric matrix material into a sheet, cooling said sheet to form an amorphous polymeric matrix material in which crystallization is initiated but not completed, and orienting the cooled sheet in at least one direction.

2. An opaque, oriented polymeric film structure according to claim 1, wherein the thermoplastic polymer of the core layer includes one or more polyolefins.

3. An opaque, oriented polymeric film structure according to claim 2, wherein the polyolefins are selected from the group consisting of ethylene polymers, polypropylene, polybutylene, block copolymers of ethylene and propylene, random copolymers of ethylene and propylene, and blends thereof.

4. An opaque, oriented polymeric film structure according to claim 1, wherein the thermoplastic polymer of the outer or skin layer includes one or more polyolefins.

5. An opaque, oriented polymeric film structure according to claim 4, wherein the polyolefins are selected from the group consisting of ethylene polymers, polypropylene, polybutylene, block copolymers of ethylene and propylene, random copolymers of ethylene and propylene, and blends thereof.

6. An opaque, oriented polymeric film structure according to claim 1, wherein the nucleating agent is selected from the group consisting of sodium benzoate, calcium stearate, aluminum dibenzoate, aluminum adipate, sodium succinate, sodium glutarate, and sorbitol derivatives.

7. An opaque, oriented polymeric film structure according to claim 6, wherein the sorbitol derivative is 3,4-dimethylbenzylidene sorbitol.

8. An opaque, oriented polymeric film structure according to claim 1, wherein the nucleating agent is used in amount of from about 0.01 to about 0.5% by weight, based on the total weight of the outer or skin layer.

9. An opaque, oriented polymeric film structure according to claim 1, wherein two or more outer or skin layers are present.

10. An opaque, oriented polymeric film structure according to claim 1, wherein all of the voids in the core layer are free from void-initiating particles.

11. A process for making the opaque, oriented film structure of claim 1 comprising:
    (a) preparing a core layer melt mixture comprising a thermoplastic polymeric material;
    (b) preparing at least one outer or skin layer melt mixture comprising a thermoplastic polymeric material and a nucleating agent;
    (c) coextruding the melt mixtures of (a) and (b);
    (d) cooling the coextruded product to a temperature where crystallization of the core layer is initiated but not substantially completed; and
    (e) stretching the cooled, coextruded product in at least one direction.

12. A process for making an opaque, oriented film structure according to claim 11, wherein multiple rolls are used to thermally condition the film structure in the machine direction following coextrusion but before stretching.

* * * * *